J. C. SCHLEICHER.
CUSHION TIRE.
APPLICATION FILED JAN. 30, 1913.
1,086,228.
Patented Feb. 3, 1914.
2 SHEETS—SHEET 1.
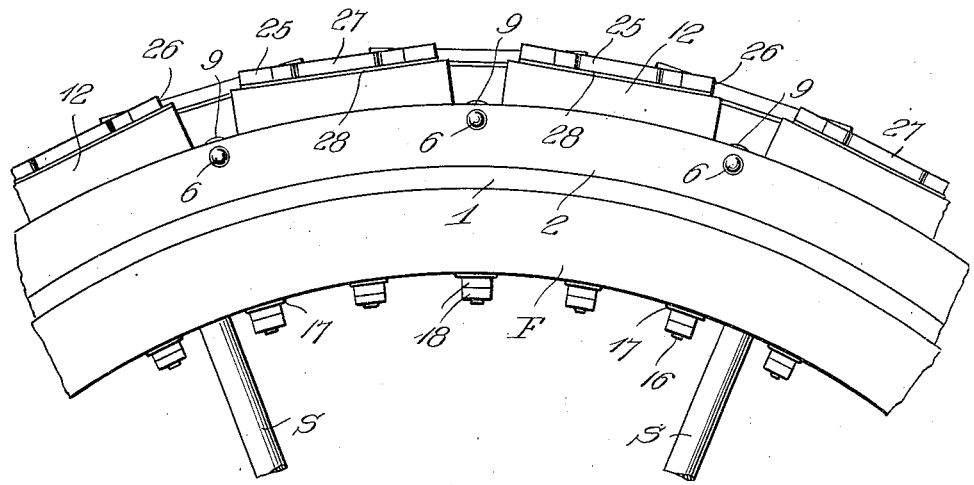
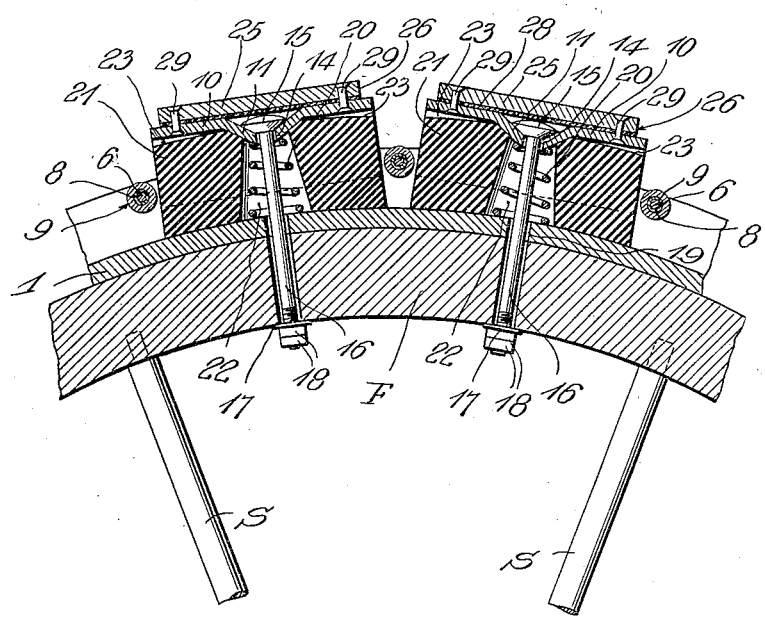
Witnesses
Inventor
John C. Schleicher
By H. B. Willson & Co.
Attorneys

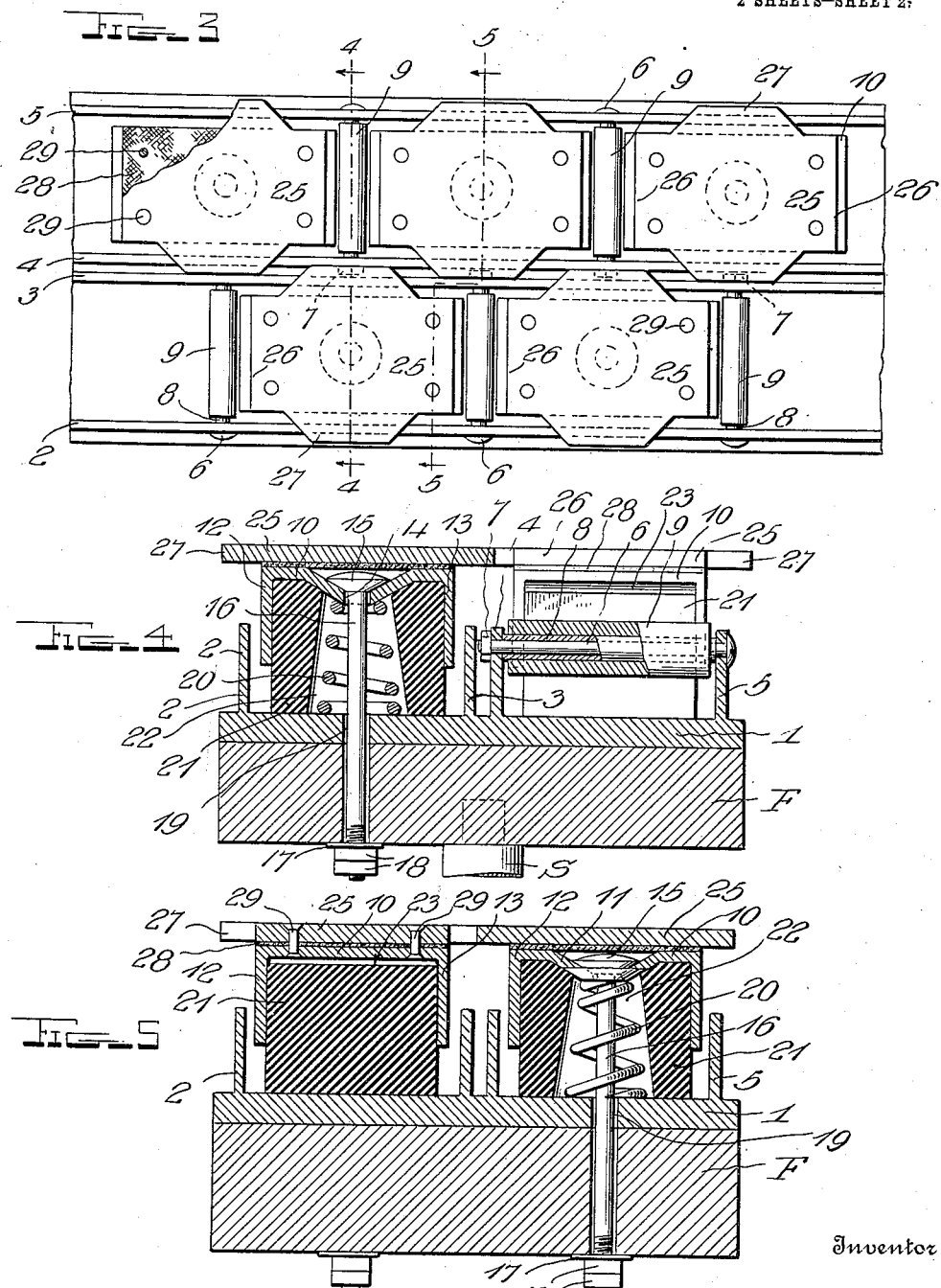

UNITED STATES PATENT OFFICE.

JOHN C. SCHLEICHER, OF MOUNT VERNON, NEW YORK.

CUSHION-TIRE.

1,086,228. Specification of Letters Patent. Patented Feb. 3, 1914.

Application filed January 30, 1913. Serial No. 745,262.

*To all whom it may concern:*

Be it known that I, JOHN C. SCHLEICHER, a citizen of the United States, residing at Mount Vernon, in the county of Westchester and State of New York, have invented certain new and useful Improvements in Cushion-Tires; and I do declare the following to be a full, clear, and exact description of the invention, such as will enable others skilled in the art to which it appertains to make and use the same.

This invention relates to resilient wheels and tires, and more especially to those which have a cushion rim composed of spring-supported plates; and the object of the same is to produce a tire of this character wherein the parts are readily accessible and replaceable at will by any ordinary mechanic without special tools.

This and other objects are accomplished by constructing the device in the manner hereinafter more fully described and claimed, and as shown in the drawings wherein—

Figure 1 is a side elevation of a portion of this tire, and Fig. 2 is a longitudinal sectional view thereof. Fig. 3 is a plan view; and Figs. 4 and 5 are cross sections on the lines 4—4 and 5—5 respectively of Fig. 3.

In the drawings the letter F designates the felly supported on spokes S which radiate from a hub (not shown), and around the felly in place of the ordinary metallic tire I secure a metal band 1 forming part of this improved tire, the band having four parallel ribs, 2, 3, 4, and 5 projecting from its outer face and disposed about as shown in Figs. 4 and 5. That is to say, the outermost ribs 2 and 5 stand near the side edges of the band 1, and the innermost ribs 3 and 4 stand near its center but are slightly spaced from each other. Thus are formed two channels, one between the ribs 2 and 3, and the other between the ribs 4 and 5; and in these channels I dispose two sets or rings of devices which are duplicates of each other, and hence a description of one will suffice for both. I call attention to the fact, however, that as seen in Fig. 3 the devices are disposed in staggered relation so as to break joint with each other, whereby a continuous tire or tread portion of this wheel is produced because there are no spaces which extend completely across the same.

It is quite within the province of my invention, for an extremely wide wheel or one to be used under a very heavy truck or the like, that a greater number of channels could be employed by providing a greater number of pairs of ribs disposed side by side as herein shown, and a greater number of rings of devices around the channels as will be readily understood.

I may say at this point that the materials and proportions of parts are not essential to the successful carrying out of this invention, and although the felly F is that ordinarily employed on wheels to be used beneath heavy wagons and motor trucks, it is quite clear that my improved tire could be applied to metal wheels with equal facility.

The channel produced by each pair of ribs has transverse bolts 6 extending across it at regular intervals, their nuts 7 preferably being disposed in the space between the intermediate ribs 3 and 4 as seen in Fig. 4, and their heads preferably outermost where they can be reached by an ordinary screw driver while a wrench takes hold of the nuts; and on each bolt is placed a spacing sleeve 8 which is the full width of the space between the inner faces of the ribs, and around this sleeve is journaled a roller 9 whose length is slightly less than that of the sleeve. The result is that the roller can rotate freely on the sleeve, and has a very slight movement longitudinally thereon between the two ribs, to prevent binding of parts.

In what might be called the pocket, which is the space bounded by two of the ribs and two of the rollers, is disposed a member which might be called a section of the tread, the same consisting of a plate 10 which is rectangular in plan view as seen in Fig. 3 in dotted lines, and has its side edges turned inward into rather wide flanges 12 and 13 whose outer faces stand at somewhat lesser distance apart than the inner faces of the ribs 2 and 3 between which these flanges project, as seen in Fig. 4. The center of this plate is depressed as at 11 and pierced with a hole 14, and in the depressed portion stands the head 15 of a large bolt 16 whose shank passes through said hole, and thence inward through the metallic band 1, the felly F (the hole in which it fits rather loosely), and through a washer 17 inside the felly, beyond which it receives a nut or nuts 18 for holding it in place. Surrounding this bolt between the band 1 and the depressed portion 11 of the tread-plate, is a strong coiled expansive spring 20, preferably slightly conical as seen in Figs. 4 and 5, and the expansive tendency of this spring is limited by the nut 18 and washer 17 coming in contact with the inner side of the felly F, when the head 15 is drawn down into the depression 11—at this time the flanges 12 and 13 standing in the relative position to the ribs 2 and 3 which is shown in Fig. 4. Finally, a rubber block 21 fills the space between the flanges 12 and 13, and has at its center a cavity 22 which is of ample size to receive the spring even when the latter is compressed and therefore distended laterally; and the ends of the outer face of this block are cut off slightly as seen at 23 in Fig. 2 although its center closely fits around the depressed portion and beneath the flat part of the tread plate 10 at either side of said depressed portion, so that the tread is firmly held by the block 21 as well as by the spring 20, but the former does not prevent it from rocking freely while the spring also permits this movement.

The shoe portion of this improved tire, or that part which comes in direct contact with the earth's surface, is also by preference of metal, being formed in the shape of a plate 25 which is substantially rectangular although somewhat shorter in length than the tread plate 10 so that its ends 26 fall short of the extremities of the tread; and at each side the shoe plate may have a lateral extension 27 overlying the space between the tread-flange and the contiguous rib, and the extensions along the mid-width of the tire overlapping the space between the intermediate ribs 3 and 4. As seen in Fig. 3, these extensions break joint with each other, with the result that there is no continuous channel left along the transverse center of this tire, as is so commonly found in heavy truck tires now in everyday use, and I consider this a feature of improvement in my invention because such channels are apt to become filled with foreign matter.

The fact that the shoe is shorter than the tread provides corners or angles at both ends of each member of this improved chain or series which engage the roadway or pavement without embedding the same, and of course will prevent slipping; and yet it will be seen from Fig. 3 that there are no transverse channels completely across this tire which also might become filled with foreign matter. This shoe plate 25 overlies the tread plate 10, and a strip of fabric—preferably canvas—is interposed between them as shown at 28, the two plates and fabric being riveted together as illustrated at 29. There is no reason why the outer face of the shoe plates 25 could not be made rough or irregular, or provided with projections which might indent or engage the surface of the earth to prevent slipping, but these details form no part of the present invention.

With a cushion tire as above constructed, the action of the device is as follows: When the wheel revolves until the weight of the load is thrown onto any particular member, it falls first onto one end of the shoe—that end which is toward the rear in the direction the vehicle is traveling. The first result is that the shoe is thrown out of a line standing at strict right angles to the length of the bolt, is borne upward against the tread-plate and the latter rocks around the bolt at a point where the hole 14 in its depressed center 11 surrounds the shank 16 thereof—the beveled off front end of the rubber block 21 permitting. As the vehicle progresses until the wheel-hub stands directly over the member in question, the thrust is directly downward along the line of the bolt, and the parts stand in the position shown in the drawings, excepting that under the weight of the load the spring 20 and block 21 are compressed to a greater extent and the bolt is pushed upward through the band 1 and felly F in a manner which will be clear. As the vehicle progresses further this action is repeated in inverted order at the rear end of the section or member in question, but it should be noted that at the time the load is passing off of this member it is passing onto the fellow member in the adjacent ring or row so that no interval exists during which the load is not well supported. The forward and rearward rocking of the tread plate and its shoe plate may be increased in case the vehicle should pass over a little obstruction, and it is quite possible that these members could rock transversely if the obstruction were not directly in front or in rear of the bolt, as lateral rocking is permitted by the space between the flanges 12 and 13 and the contiguous ribs 2 and 3. Forward and rearward rocking is permitted by the looseness which exists between the front and rear ends of said flanges and the rollers 9 directly in front and in rear of the member in question. The presence of these rollers serves an additional function, which is that when the wheel carrying this tire is one of the driving wheels of a motor vehicle which may be ascending a steep hill or carrying a heavy load, there is considerable strain thrown upon the tire as the motor propels the felly rearward to drive the vehicle forward, and this strain is resisted by the ends of the flanges coming in contact with the rollers, and the rollers communicate this strain to the ribs. In case any member should become defective or broken, it may be easily replaced by withdrawing the nut or nuts 18 from the inner end of the bolt 16, and lifting the entire member off the wheel. At this time the spring or the rubber block may be replaced. If the break or defect is in some other part, it can be remedied by removing the rivets, after which the entire bolt can be drawn out of place.

The simplicity of the device will commend it to users who are not skilled mechanics and need not be possessed of any special tools excepting that it may require a thin end-wrench to hold the nuts 7 at the inner ends of the bolts 6 when the latter are put in through the sleeves 8 and rollers 9.

I do not wish to be limited to specific details further than as set forth in the claims below, and changes therein may be made at the will of the manufacturer or user. The materials and proportions of parts are not essential.

What is claimed as new is:

1. A yielding tire for vehicle wheels made up of sections, each including a flat plate having inturned flanges along its side edges and a hole through the center of its body, a bolt passing loosely through said hole and adapted to pass through the rim of the wheel, a rubber block within the space between said flanges and having its outer face cut away at its ends beneath the ends of said plate for the purpose set forth, a shoe carried by and wider than said plate, a band adapted to surround the wheel and having outstanding parallel ribs between which said flanges project loosely, and bolts connecting said ribs and passing across the ends of the flanges.

2. A yielding tire for vehicle wheels made up of sections, each including a flat plate having inturned flanges along its side edges and a depressed center pierced with a hole, a bolt whose shank passes through said hole and whose head rests in said depression, a rubber block within the space between said flanges and having its outer face cut away at its ends beneath the ends of said tread-plate for the purpose set forth, and a shoe carried by said tread-plate.

In testimony whereof I have hereunto set my hand in presence of two subscribing witnesses.

JOHN C. SCHLEICHER.

Witnesses:
L. O. HILTON,
M. H. STUARD.

---

Copies of this patent may be obtained for five cents each, by addressing the "Commissioner of Patents, Washington, D. C."